United States Patent Office 3,477,204
Patented Nov. 11, 1969

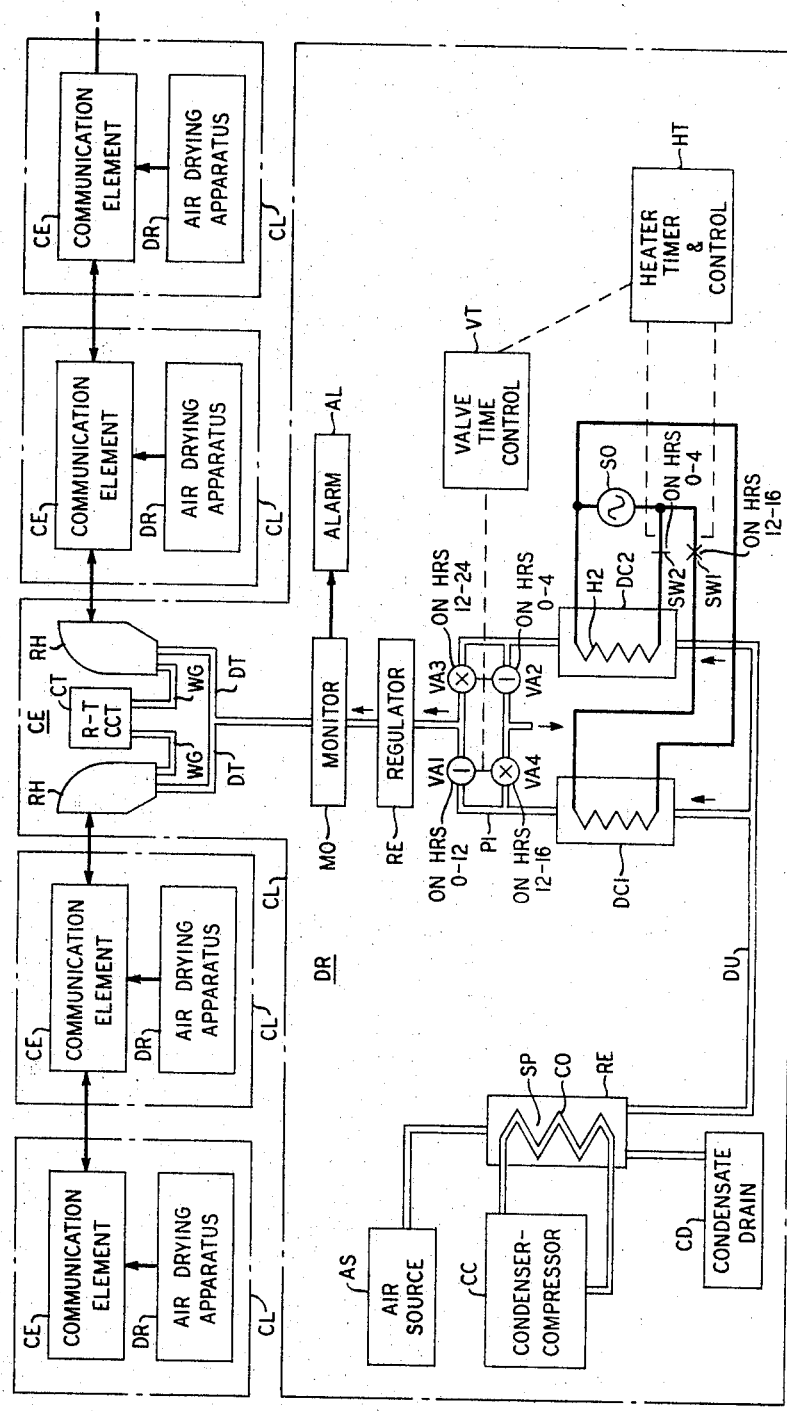

3,477,204
AIR DRYING SYSTEM
Jesse M. Jackson, Fair Haven, N.J., assignor to Bell Telephone Laboratories, Incorporated, Murray Hill and Berkeley Heights, N.J., a corporation of New York
Filed Sept. 12, 1967, Ser. No. 667,156
Int. Cl. B01d 53/02
U.S. Cl. 55—33                                   10 Claims

ABSTRACT OF THE DISCLOSURE

The continuous dry air flow needed for keeping telephone cable, or relay station antennas and waveguides, free of moisture is obtained by pumping ambient air through a moisture removing refrigerator, then pumping it through a desiccating column while diverting a part of the refrigerated air to clear moisture from a second desiccating column that is being heated, and then periodically alternating the heating operations as well as the flow through the columns.

BACKGROUND OF THE INVENTION

This invention relates to environmental controls for communication systems, particularly for maintaining cables, splices, repeaters, radio relay horns, waveguides, and other elements of communication systems free from the efficiency-deteriorating effects of moisture in the form of water or water vapor.

In present communication systems such elements are protected from water and water vapor by enclosing them and continuously pumping dry air into their enclosures. This maintains them under continuous positive pressures. The pressurized dry air may be obtained from sources such as gaseous nitrogen cylinders. Typically however, ordinary atmospheric air has its moisture reduced, that is it is dehydrated, by pressurizing it and condensing the moisture therefrom in a refrigerating device, or by passing it through moisture-adsorbing desiccating materials. Patent No. 3,144,314 discloses a two-stage system. A heat exchanger first cools the ambient air to dehydrate it partially, and a refillable column containing silica gel then furnishes additional dehydration.

Such systems have been found wanting. The need for replacing exhausted desiccant materials in desiccating columns results either in inconvenience and high costs or in the use of extremely large desiccating towers to maximize the time between refills. On the other hand, refrigeration dryers alone, in order to obtain the desired dryness for operation with communication equipment, have to operate at high pressures such as 150 pounds per square inch. The high pressure requires oil lubrication which eventually enters the communication system and contaminates the elements. This deteriorates the operating efficiency of the communication equipment. The high pressure air refrigerant cooling systems also introduce an element of danger for operating personnel. It requires that all heat exchangers be subjected to approval by various safety organizations. While refrigerant-dehydrated air subsequently passed through a desiccant as disclosed in the beforementioned Patent 3,144,314 permits the use of safe carbon-ring-lubricated low-pressure compressors, or the use of diaphragm compressors, the extensive servicing or large desiccating equipment required by the desiccating columns still constitute a disadvantage.

SUMMARY OF THE INVENTION

According to a feature of the invention these disadvantages are avoided by not only passing refrigerated and partially dehumidified air through a desiccating column before passing it to the elements of a communication system, but by diverting a portion of the refrigerated partially-dehydrated air through a second desiccating column while heating the column, so that the dehydrated air further dehydrates the heated desiccating material in the column which may be moisture-laden and thereby prepare the material for a desiccating function. Control means then shift the flow of partially dehumidified air coming from the refrigeration system and going to the communication elements, through the second desiccating column rather than the first desiccating column, when the desiccant in the first desiccating column has been exhausted and saturated. A part of the refrigerated or dry air flow is then used to dehumidify and purge the now-exhausted first column. Preferably the unused column being purged is allowed to cool before again being used to dehumidify air. Since the air is partially dehydrated to a substantially constant humidity, the desiccating columns may be made the smallest size necessary for their final dehydrating function. Because they are cyclically reactivated they may be kept this small size.

Other features of the invention are pointed out in the claims. Other advantages and objects of the invention are pointed out in the following detailed description when read in light of the accompanying drawing.

DESCRIPTION OF THE DRAWING

The drawing is a schematic diagram illustrating a communications system employing environmental controls which embody features of the invention.

DESCRIPTION OF AN EMBODIMENT

In the drawing, five sequentially-linked communication links CL, of which the central link is shown in detail, form a communications system. Each link CL is composed of a communication element CE, and an air-drying apparatus DR. As shown by the details of the central one of the links, each element CE constitutes a microwave relay station wherein a horn antenna RH passes signals arriving from an adjacent link through connecting waveguides WG to a receiver-transmitter circuit CT which amplifies and sends the signal to a subsequent element CE through other waveguides WG and a second antenna RH. However, each communication element CE may also constitute the sequentially-joined central offices of a telephone system, or segments of telephone transmission cables whose interiors are subject to internal air pressures. In the links the air-drying apparatuses DR each furnish a flow of dry air through suitable ducts DT into those enclosed portions, such as the waveguides WG and antennas HA of the communication element CE which must be kept dry. The dry air drives the air within that portion of the element to be dried outwardly to the atmosphere. The outward flow occurs through normal seepage. In the relay stations of FIG. 1, the air-drying apparatuses DR purge and dry the air within the waveguides and antennas RH of each element CE. However, they may purge and dry the air within the entire element. Where the elements CE constitute such instruments as segments of telephone transmission cables, the apparatuses DR purge and dry the interiors of sequential cable sections.

The air-drying apparatuses of which one is shown in more detail, each include an air source AS such as a pump which forces air at pressures from two-tenths to thirty pounds per square inch through the interior space SP of a heat exchanger or refrigerator RE. In the refrigerator RE, cooling coils CO conduct refrigerant fluid that has been compressed and condensed in a refrigerator's compressor-condenser CC. By vaporization and expansion of the refrigerant fluid therein the coils CO absorb heat from the pressurized air in the space SP. The coils thus cool the air in space SP to temperatures of 35 to 40° F.

At the same time the cooling causes condensation of approximately 75 to 80 percent of the water vapor carried therein by the air. A condensate drain CD carries off the condensate. Ducts DU conduct the refrigerated and partially dehydrated air to a desiccating column DC1 having mounted therein a desiccating material such as silica gel, activated alumina, or a desiccant available under the trade name "Sovabead." Molecular sieves may be used in place of desiccants. The desiccating column DC1 removes virtually the remainder of moisture in the air supplied thereto. Air leaving the desiccating column DC1 has a dew point below −40° F. or a relative humidity of less than 1 percent at 70° F. A pipe P1 passes the air departing from the desiccating column DC1 through a normally conducting valve VA1 and to a regulator RE that reduces the pressure to the pressure desired in the communication transmission members. A monitor MO receiving the thus-reduced pressure indicates by an alarm AL when the humidity or pressure of the air does not conform to the desired standards. Suitable pipes pass the thus-monitored air to the ducts DT and through antennae RH and waveguides WG of the communication elements CE. This creates a pressurized environment from which vapor-carrying external air is effectively excluded and from which any water vapor in the element is effectively purged.

The portion of the partially dehydrated air emerging from the refrigerator RE through the duct DU passes through a second desiccating column DC2 and out through a normally conductive valve VA2 out to the atmosphere. At the same time a voltage source SO energizes a heating coil H2 in the desiccating column DC2 through the normally conducting contact of a switch SW2. Together the heating coil H2 and the partially dehydrated air vaporizes and purges any moisture in the desiccant of column DC2. They therefore activate the desiccant so the latter can later serve a dehydrating or dehumidifying function. The reactivating requires approximately 3 to 4 hours of such heating and purging.

Two normally nonconductive valves VA3 and VA4 form portions of pipes that respectively connect the outlet of desiccating column DC2 to the regulator and connect the outlet of desiccating column DC1 to the atmosphere. A valve time control VT regulates the valve VA1 so as to be open, i.e., conducting, during hours 0 to 12 in a 24-hour cycle and shut off during the remaining hours. Conversely, the valve timer VT regulates the valve VA3 to be shut off during hours 0 to 12 but on during hours 12 to 24 of the same cycle. Moreover, valve timer VT regulates valve VA4 to be on during hours 12 to 16 and shut off during hours 16 to 24 and 0 to 12. Valve VA2 is then regulated to be on during hours 0 to 4 and shut off during hours 4 to 24. A heater timer HT in cooperation with the valve timer VT closes the switch SW2, that is it makes it conductive for the hours 0 to 4 of the 24-hour cycle. This causes the heater coil H2 to heat the desiccant material when the air which has been partly refrigerated in the refrigerator RE passes through the desiccating column DC2.

Starting at time 0 in the 24-hour cycle, at the end of approximately four hours the desiccant in the desiccating column DC2 is regenerated, that is the moisture has been driven off. The current to the heating coil H2 as well as the partially dehydrated supply of air stops. This gives the dehydrated and heated desiccant eight hours to cool off before it need operate in its desiccating capacity. As a result, during the desiccating operation by the desiccating column DC1 when the output of the desiccating column DC1 appears at the regulator RE, the partially dehydrated air from the refrigerator RE passes through the desiccating column DC2 and valve VA2. This heating and purging continues for the first four hours of operation of the desiccating column DC1. It has the effect of vaporizing and flushing the material in the desiccating column DC2 and thereby removing the moisture therein so as to prepare it for the dehydrating of air in the second 12-hour portion of the 24-hour cycle. After the first 12-hour period, the valve VA1 shuts off and valves VA3 and VA4 open. As a result, part of the partially dehydrated air now passes through the desiccating column DC2 to be dehydrated and to the regulator. The air emerging from the column DC2 now has a dew point of −40° F. or a relative humidity of less than 1 percent at 70° F. The partially dehumidified air passing helps reactivate the desiccating column DC1 and goes out to the atmosphere. At the same time, that is at 12 hours, the heater timer HT turns on the contacts of a normally open switch SW1. A heating coil H1 energized by the source SO through switch SW1 starts heating the desiccant material in the desiccating column DC1 which had previously in hours 0 to 12 adsorbed moisture from the partially dehydrated air. Four hours later when the desiccant in column DC1 is reactivated, that is at 16 hours in the cycle, the switch SW1 is made nonconductive and valve VA4 closed or blocked. Now the entire content of the refrigerator passing through the duct DU passes through the desiccating column DC2 and the valve VA3 to the regulator RE. This continues for the remainder of the second 12-hour half cycle. At the end of 24 hours the operation of desiccating column DC1 begins again and continues passing desiccated air to its communication element CE. Similarly, the regeneration of desiccating column DC2 again begins.

The drying apparatus DR furnishes a continuous flow of dry air through the communication element CE and protects it from the entrance of moisture. At the same time removal of desiccating material for the purpose of regeneration is completely unnecessary and yet the effectiveness and efficiency of desiccating material regenerated, is available at all times. By virtue of the partially dehydrated air emerging from the refrigerator, the heater rapidly regenerates each of the desiccating materials in each of the desiccating columns DC1 and DC2. Yet by the end of a complete half cycle, the materials of the column are cool enough to permit efficient reuse.

The length of the completed cycles may be varied in accordance with the size and operation of the desiccating columns. Moreover, the phasing of the heater relative to the valve timer may also be changed to provide the most efficient regeneration. As a further point, it is possible to use some of the dry air emerging from one column to dehydrate the other column.

Thus, in operation the communication elements, each of which is purged by dryers associated therewith operate in their most efficient manner.

The term dehydrate is used herein in the sense of reducing the moisture content or absolute humidity of the air.

While an embodiment of the invention has been described in detail, it will be obvious to those skilled in the art that the invention may be practiced otherwise within its spirit and scope.

What is claimed is:

1. A communications system comprising moisture sensitive transmission means, enclosure means surrounding a portion of said transmission means, a gas pressure source, refrigeration means for partially dehydrating gas from said pressure source, first and second moisture adsorbing means, pipe means for passing the partially dehydrated gas from said refrigeration means through each of said moisture adsorbing means, means including valve means for alternately passing the gas through said first and then said second moisture adsorbing means into said enclosure means in successive cycles so as to remove moisture from said transmission means and for alternately passing the gas from said second and then said first moisture adsorbing means and away from said enclosure means during at least a portion of each of said cycles so as to dehydrate said second and then said first moisture adsorbing means, and means to heat said second and then said first moisture adsorbing means alternately during said latter gas flow.

2. A system as in claim 1 wherein electrical heating means form a portion of each moisture adsorbing means and include switch means for energizing the heating means in the one of said moisture adsorbing means through which said valve means passes the gas away from said enclosure means.

3. A system as in claim 2 wherein said switch means alternately energize said heating means in the one of said desiccating means for only a portion of the time that the valve means passes the gas from said other moisture adsorbing means to said enclosure means.

4. A system as in claim 1 wherein said valve means alternately pass gas through one of said moisture adsorbing means away from said enclosure means for only a portion of the time while passing gas from the other of said moisture adsorbing means to said enclosure means.

5. A drying apparatus comprising a gas source, an output, refrigerator means for partially dehydrating the gas from said source, first and second moisture adsorbing means, valve means for passing said gas from said refrigerating means to both of said moisture adsorbing means and alternately out to said output, and temperature control means for raising the temperature of said moisture adsorbing means other than the one from which gas is being passed to said output whereby the partially dehydrated air from said refrigerator means alternately vaporizes the moisture therein while the moisture adsorbing means through which gas is being passed to said output draws the remaining moisture from the partially dehydrated gas.

6. An apparatus as in claim 5 wherein said valve means includes a first valve for selectively releasing said first adsorbing means to said output, a second valve for selectively releasing gas in said first adsorbing means, a third valve for selectively connecting said second adsorbing means to said output, a fourth valve for selectively releasing gas in said second adsorbing means, and time control means for turning on and off said first valve while simultaneously turning off and on said third valve and for turning on said fourth valve during a portion of the time that said first valve is on and turning on said second valve during a portion of the time that said third valve is on.

7. An apparatus as in claim 5 wherein said valve means permit flow through the moisture adsorbing means whose moisture is being vaporized only for a fraction of the time during which the other of said moisture adsorbing means adsorbs moisture from the partially dehumidified gas.

8. An apparatus as in claim 6 wherein said temperature control means raises the temperature of one of said adsorbing means for only a fraction of the time that the other of said adsorbing means removes moisture from the partially dehydrated gas.

9. The method of treating gas which comprises refrigerating gas under pressure and draining of the thus-formed condensate, cyclically adsorbing the moisture in part of the partly dehydrated gas with one of two adsorbers and then alternately the other in successive cycles, passing the remaining partly-dehydrated gas through the other adsorber during at least a portion of each of said cycles, and alternately heating the other and then the one adsorber so the partly-dehydrated gas carries off moisture in the other and then the one adsorber during flow of said remaining partly dehydrated gas therethrough.

10. The method as in claim 9 wherein the gas is passed through the adsorber from which moisture is being carried off, and wherein that adsorber is heated, only for a fraction of the time that the other adsorber dehydrates the gas in each cycle.

References Cited
UNITED STATES PATENTS

| | | | |
|---|---|---|---|
| 3,119,673 | 1/1964 | Asker et al. | 55—76 |
| 3,225,517 | 12/1965 | Wachsmuth | 55—76 |

REUBEN FRIEDMAN, Primary Examiner

CHARLES N. HART, Assistant Examiner

U.S. Cl. X.R.

55—76, 179